(12) United States Patent
Fotland et al.

(10) Patent No.: US 7,047,396 B1
(45) Date of Patent: May 16, 2006

(54) FIXED LENGTH MEMORY TO MEMORY ARITHMETIC AND ARCHITECTURE FOR A COMMUNICATIONS EMBEDDED PROCESSOR SYSTEM

(75) Inventors: David A. Fotland, San Jose, CA (US); Roger D. Arnold, Sunnyvale, CA (US); Tibet Mimaroglu, Sunnyvale, CA (US)

(73) Assignee: Ubicom, Inc., Mountain View, CA (US)

( * ) Notice: Subject to any disclaimer, the term of this patent is extended or adjusted under 35 U.S.C. 154(b) by 374 days.

(21) Appl. No.: 09/888,295

(22) Filed: Jun. 22, 2001

Related U.S. Application Data

(60) Provisional application No. 60/213,745, filed on Jun. 22, 2000, provisional application No. 60/250,781, filed on Dec. 1, 2000.

(51) Int. Cl.
*G06F 7/38* (2006.01)
(52) U.S. Cl. .................. 712/221; 712/24; 712/204; 712/210; 712/300
(58) Field of Classification Search ................ 712/221, 712/222, 21, 24, 41, 204, 210, 220, 300
See application file for complete search history.

(56) References Cited

U.S. PATENT DOCUMENTS

| | | | | |
|---|---|---|---|---|
| 4,110,831 | A | * | 8/1978 | Langdon, Jr. ............. 708/550 |
| 4,777,587 | A | * | 10/1988 | Case et al. ............... 712/235 |
| 4,821,187 | A | | 4/1989 | Ueda et al. |
| 4,825,355 | A | * | 4/1989 | Kurakazu et al. ......... 712/224 |
| 4,939,735 | A | | 7/1990 | Fredericks et al. |
| 5,163,146 | A | | 11/1992 | Antanaitis, Jr. et al. |
| 5,247,636 | A | | 9/1993 | Minnick et al. |
| 5,260,703 | A | | 11/1993 | Nguyen et al. |
| 5,392,435 | A | | 2/1995 | Masui et al. |
| 5,410,658 | A | | 4/1995 | Sawase et al. |
| 5,430,884 | A | | 7/1995 | Beard et al. |
| 5,515,538 | A | | 5/1996 | Kleiman |
| 5,524,250 | A | | 6/1996 | Chesson et al. |
| 5,727,211 | A | | 3/1998 | Gulsen |
| 5,761,470 | A | | 6/1998 | Yoshida |

(Continued)

FOREIGN PATENT DOCUMENTS

WO     WO 99/54813     10/1999

OTHER PUBLICATIONS

Intel Corporation, Pentium Processor Family Developer's Manual, vol. 3: Architecture and Programming Manual, 1995, pp. 25-1 to 25-30.*

(Continued)

*Primary Examiner*—Dov Popovici
*Assistant Examiner*—Tonia L. Meonske
(74) *Attorney, Agent, or Firm*—Fenwick & West LLP

(57) ABSTRACT

A method and system for fixed-length memory-to-memory processing of fixed-length instructions. Further, the present invention is a method and system for implementing a memory operand width independent of the ALU width. The arithmetic and register data are 32 bits, but the memory operand is variable in size. The size of the memory operand is specified by the instruction. Instructions in accordance with the present invention allow for multiple memory operands in a single fixed-length instruction. The instruction set is small and simple, so the implementation is lower cost than traditional processors. More addressing modes are provided for, thus creating a more efficient code. Semaphores are implemented using a single bit. Shift-and-merge instructions are used to access data across word boundaries.

8 Claims, 12 Drawing Sheets

U.S. PATENT DOCUMENTS

| | | |
|---|---|---|
| 5,867,725 A | 2/1999 | Fung et al. |
| 5,907,694 A * | 5/1999 | Suzuki et al. ............... 712/210 |
| 5,933,650 A | 8/1999 | van Hook et al. |
| 5,944,816 A | 8/1999 | Dutton et al. |
| 6,009,505 A | 12/1999 | Thayer et al. |
| 6,026,503 A | 2/2000 | Gutgold et al. |
| 6,085,215 A | 7/2000 | Ramakrishnan et al. |
| 6,317,774 B1 | 11/2001 | Jones et al. |
| 6,366,998 B1 | 4/2002 | Mohamed |
| 6,378,018 B1 | 4/2002 | Tsern et al. |
| 6,385,713 B1 | 5/2002 | Yung |
| 6,460,116 B1 * | 10/2002 | Mahalingaiah ............. 711/125 |
| 6,493,741 B1 | 12/2002 | Emer et al. |
| 6,542,991 B1 | 4/2003 | Joy et al. |
| 6,567,839 B1 | 5/2003 | Borkenhagen et al. |
| 6,718,360 B1 | 4/2004 | Jones et al. |
| 6,728,722 B1 | 4/2004 | Shaylor |
| 6,766,515 B1 | 7/2004 | Bitar et al. |
| 2003/0037228 A1 | 2/2003 | Kelsey et al. |
| 2003/0110344 A1 | 6/2003 | Szczepanek et al. |

OTHER PUBLICATIONS

Nemirovsky, Dr. Mario Daniel; Brewer, Dr. Forrest; and Wood, Dr. Roger C.; DISC: Dynamic Instruction Stream Computer; 1991; ACM; pp. 163-171.

Schwan, Karsten and Zhou, Hongyi; Dynamic Scheduling Of Hard Real-Time Tasks And Real-Time Threads; IEEE Transactions On Software Engineering; vol. 18, No. 8; Aug. 1992; pp. 736-748.

Eggers, S. et al., "Simultaneous Multithreading: A Platform for Next-Generation Processors," IEEE Micro, Oct. 1997, pp. 12-19.

El-Kharashi, et al., Multithreaded Processors: The Upcoming Generation for Multimedia Chips, 1998 IEEE Symposium on Advances in Digital Filtering and Signal Processing, Jun. 5-6, 1998, pp. 111-115.

* cited by examiner

| OPCode 6 bits | Source1 Register 5 bits | Source2 Register 5 bits | Target Register 5 bits | Sub-OPCode 11 bits |

Figure 1C

| OPCode 6 bits | Target Register 5 bits | Source1 Register 5 bits | Immediate 16 bits |

Figure 1D

| OPCode 5 bits | Destination 11 bits | Source2 Register 5 bits | Source1 11 bits |

| | | | | $I_4$ $I_3$ $I_2$ $I_1$ $I_0$ | Row 1 |
|---|---|---|---|---|---|
| 1 | $I_6$ | $I_5$ | | | |
| 0 | 1 | 1 | $A_2 A_1 A_0$ | $R_4$ $R_3$ $R_2$ $R_1$ $R_0$ | Row 2 |
| 0 | 1 | 0 | | M $I_3$ $I_2$ $I_1$ $I_0$ | Row 3 |
| 0 | 0 | 1 | Register Direct | | Row 4 |
| 0 | 0 | 0 | Immediate | | Row 5 |

Figure 6

FIXED LENGTH MEMORY TO MEMORY ARITHMETIC AND ARCHITECTURE FOR A COMMUNICATIONS EMBEDDED PROCESSOR SYSTEM

RELATED APPLICATIONS

This application claims priority from U.S. provisional application No. 60/213,745 filed on Jun. 22, 2000, and from U.S. provisional application No. 60/250,781 filed on Dec. 1, 2000, which are both incorporated by reference herein in their entirety.

BACKGROUND OF THE INVENTION

1. Field of the Invention

The present invention relates to processor instruction sets, and more particularly to fixed length instruction sets for processors.

2. Description of Background Art

Over the past few years, Internet connectivity has been increasing at an astounding rate. Embedded processors are being increasingly used to provide this connectivity. Internet processing has little arithmetic, but involves manipulation of memory buffers for packets and headers. A lot of data is moved without being transformed, especially in the communications field. Another often encountered task is to change or examine bit-fields in headers.

Conventionally, Reduced Instruction Set Computer (RISC) or Complex Instruction Set Computer (CISC) processors have been used for these tasks. However, both RISC and CISC prove to be problematic, especially when dealing with narrow data (e.g., 16-bit data) which is common in the communications field.

When data in memory needs to be manipulated, RISC processors traditionally move data from memory to registers ("Load"), perform the desired arithmetic calculations on them, and then move the result back from the register to memory ("Store"). The Arithmetic Logic Unit (ALU) instructions and the data from the registers are 32-bit wide in RISC processors. The data from memory may be of 8, 16, or 32 bits. If the data is 8 or 16 bits wide, it is sign extended to make it 32 bits before arithmetic is performed on it. Once the arithmetic is performed, it is truncated to 8 or 16 bits and then stored in memory. Due to the Load & Store architecture of RISC processors, numerous instructions are often required for simple operations. In addition, one RISC instruction can use at most one memory operand (e.g., load and store instructions), or no memory operands (e.g., arithmetic instructions).

In CISC processors, operations can be performed on data in memory without having to load and then later store the data. The instruction set itself specifies the width of the operands, as well as the width of the arithmetic. However, in order to do this, the instruction set in CISC processors is variable in length.

Further, although many conventional chips include Direct Memory Access (DMA) engines to offload data movement from the main processor and special purpose assists, these DMA engines or special purpose assists take up valuable silicon real-estate, and make the software more complex.

In the communications field, narrow data (e.g., 16-bit data or 8-bit data) needs to be dealt with efficiently. In particular, communications data is often 16 bits wide. Therefore similar support for 32-bit wide data and 16-bit wide data is needed. That is, a processor should be similarly robust for processing 32-bit wide data as well as 16-bit data. At the same time, keeping the arithmetic and register data at 32 bits simplifies the hardware design. However, narrow data in 32-bit registers can be problematic. One of the reasons why 16-bit data in 32 bit registers complicates hardware is because it can result in partial register writes. A partial register write occurs as a result of an instruction which changes part of a register and leaves the rest of the register unmodified. In a pipelined machine, the bypassing of data from one instruction to the next becomes much more complicated because of partial writes. Further, instructions may need to be specific regarding which part of a 32-bit register to use.

In conventional systems, memory operand width is dependent on ALU width. For instance, if the ALU is 32 bits wide, the memory operand is also 32 bits wide. In contrast, if the memory operand width were to be independent of the ALU width, data could be stored more efficiently in memory. For instance, if the memory operand were to be, say, 16 bits wide, it could be stored in memory as 16-bit data, rather than extending it to 32 bits.

Therefore, what is needed is (1) a processor with memory operand widths which are independent of the ALU width; (2) a processor to provide similarly robust processing for 32-bit and 16-bit data, without significantly increasing the complexity of hardware and software; and (3) fixed-length instructions which can have multiple memory operands.

SUMMARY OF THE INVENTION

The present invention is a method and system for a fixed length memory-to-memory instruction set. The present invention provides similarly robust support for 16-bit and 32-bit data. Further, the present invention is a method and system for implementing a memory operand width independent of the ALU width.

A fixed length instruction set allows for fast pipeline processing. At the same time, the ability to access data from memory directly without first having to load it to a register is important. The instruction set in accordance with one embodiment of the present invention comprises fixed length instructions, and allows direct access to memory. Thus a system in accordance with the present invention enables very high performance when processing network traffic. The instruction set is small and simple, so the implementation is lower cost than traditional processors. Since the instruction set is more efficient, fewer instructions are required, so less memory is used, which further reduces cost. Moreover, the processor can operate at a lower clock frequency, saving power.

In one embodiment of the present invention, general instructions (e.g., add) can have a first source operand from memory, a second source operand from a register, and a memory operand as a destination. Like a RISC processor, the arithmetic and the register operand are 32 bits. However, in the present invention, the size of the memory operands is independent of the ALU width. The instruction specifies the size of the memory operands. Having the instruction specify the operand width for memory access saves encoding space in the instruction set. Further, the memory operands are encoded using a fewer number of bits, thus enabling a 32-bit instruction with multiple memory operand specifiers.

A processor's ability to handle two memory operands in one instruction reduces the number of instructions required to perform many functions. For instance, data can be moved from one memory location to another in a single instruction. Another example of the use of two memory operands is that data from memory can be added with data from a register and stored in memory with a single instruction. This function can be performed without the steps of loading the data to a register, performing the add, and then storing the result. The present invention serves to eliminate several of the load and store instructions inherent in RISC architecture, while still maintaining simple hardware and software.

In addition to using multiple memory operands in a single instruction, in one embodiment of the present invention, each of the memory operand specifiers are provided with more powerful addressing modes. These addressing modes permit a higher code density, and thus a relatively smaller code size.

In an aspect of the present invention, a system in accordance with one embodiment of the present invention can implement a single-bit semaphore. In another aspect of the present invention, a "shift-and-merge" instruction can be implemented to access information which is split across two words. In yet another aspect of the present invention, in a multi-thread environment, instruction read, instruction write and instruction erase instructions are implemented using two slots assigned to a specific thread in order to avoid interference with other threads.

BRIEF DESCRIPTION OF THE DRAWINGS

FIG. 1C is an example of an instruction format used by a RISC processor.

FIG. 1D is another example of an instruction format used by a RISC processor.

FIG. 4 is an instruction format for an embodiment of the present invention.

FIG. 6 illustrates the encoding of various addressing modes in one embodiment of the present invention.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

Figure 1A:
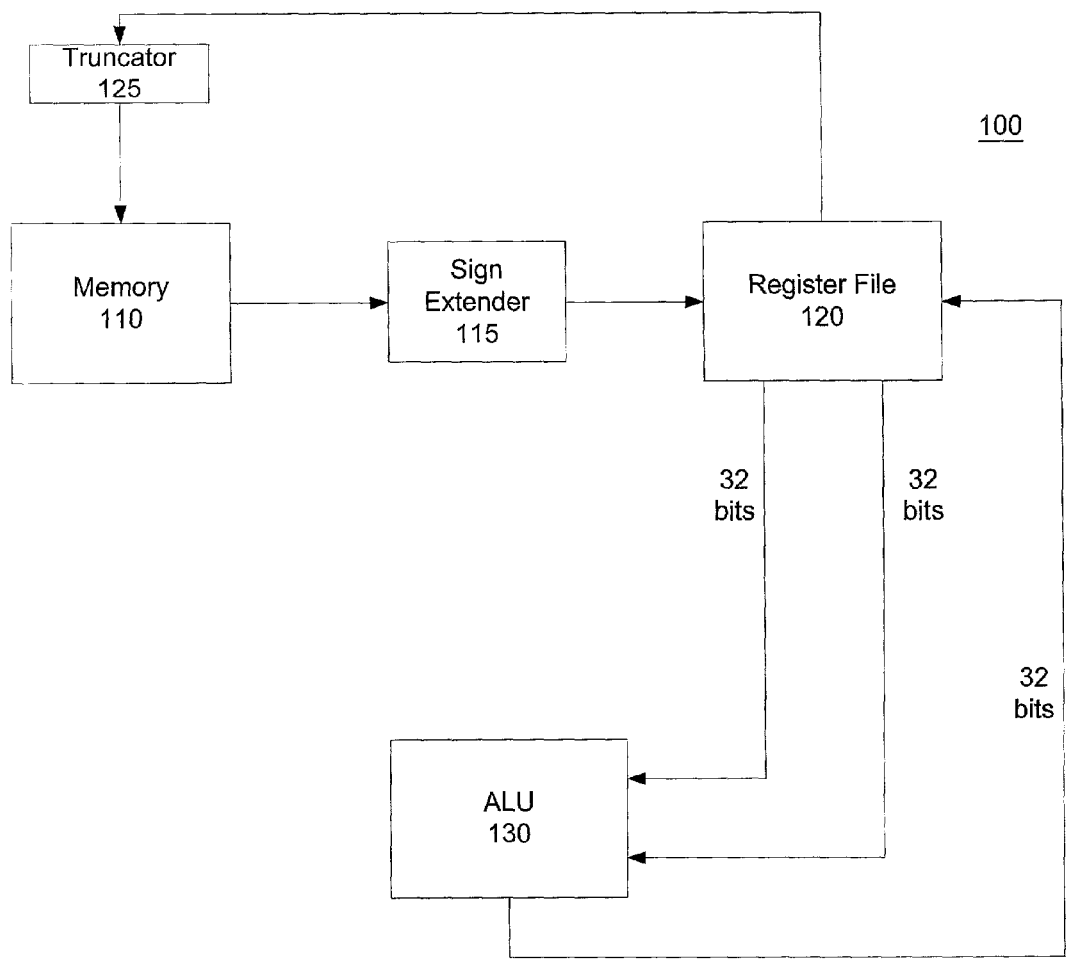
FIG. 1A is a block diagram representing a RISC processor.

One type of conventional processor has a Reduced Instruction Set Computer (RISC) architecture. FIG. 1A is a block diagram illustrating one possible implementation of a conventional RISC processor 100. The RISC processor comprises a memory 110, a register file 120, and an Arithmetic Logical Unit (ALU) 130. The RISC processor 100 may also include a sign extender 115 and a truncator 125. The register file 120 can include one or more registers.

Figure 1B:
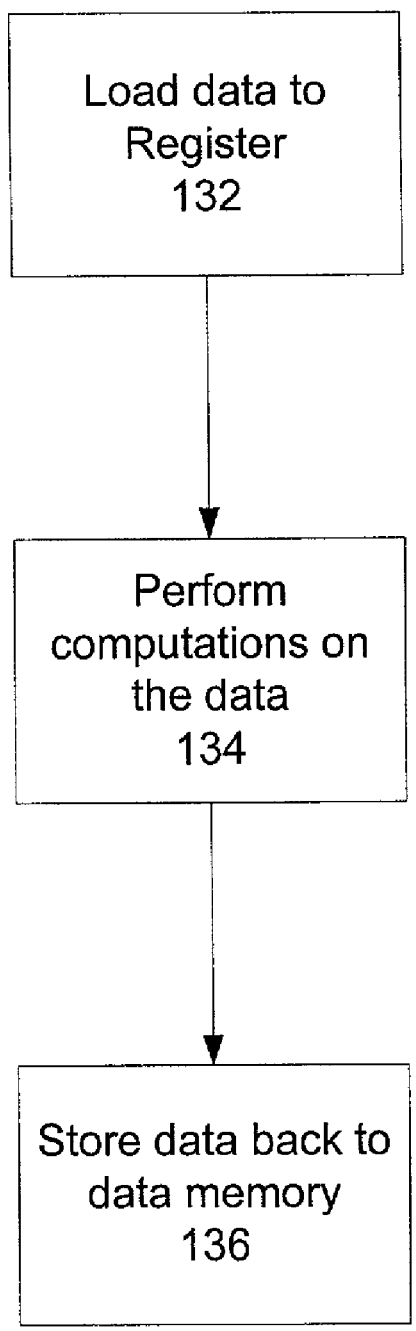
FIG. 1B is a flowchart illustrating the steps performed by a RISC processor.

FIG. 1B is a flowchart illustrating the processes performed by processor 100. It includes the steps of loading 132 data to the register file 120, performing 134 computations on the data, and storing 136 data back to memory 110. As can be seen from FIG. 1B, the RISC processor 100 has a "load and store" architecture. Data from memory 110 cannot be accessed directly. The data from memory 110 is first loaded 132 into the register file 120. The ALU 130 only obtains data from the register file 120. The width of the arithmetic in the ALU 130 is 32 bits. The width of data from the register file 120 is also 32 bits. The width of the data from the memory 110 may be variable. If the width of the data from the memory 110 is 8 or 16 bits, the sign extender 115 is used to extend the data to 32 bits before it is stored in the register file 120. The ALU 130 then performs 134 the requisite computations on the data obtained from the register file 120, and the result is stored in the register file. This result can then be stored 136 from the register file 120 back to memory 110. When the result is stored 136 in memory, a truncator 125 may be used TO store the result as 8-bit or 16-bit data. Alternatively, the result may be stored as 32-bit data in the memory 110.

FIGS. 1C and 1D illustrate two possible formats for two fixed-length instructions used by the RISC processor 100. In each case, the instruction is 32 bits in length. FIG. 1C illustrates an instruction with three operands—two sources and one destination. An arithmetic instruction could have such a format. In FIG. 1C, 6 bits are used to identify the operation to be performed (the Operation Code or "OPCode"). 5 bits are used to encode the address of the first source S1, 5 bits are used to encode the second source S2, and 5 bits are used to encode the address of the target T. The remaining 11 bits are used to encode a sub-OPCode. This sub-OPCode can be used in conjunction with the OPCode, to specify one of a larger number of operations. FIG. 1D illustrates an instruction with one source data, an offset (or immediate), and a target. A "load" instruction could have such a format. In such a case, 6 bits are used to identify the OPCode, and 5 bits each are used to encode the address of the source and the target. The remaining 16 bits are used for the offset (or immediate).

Figure 2:
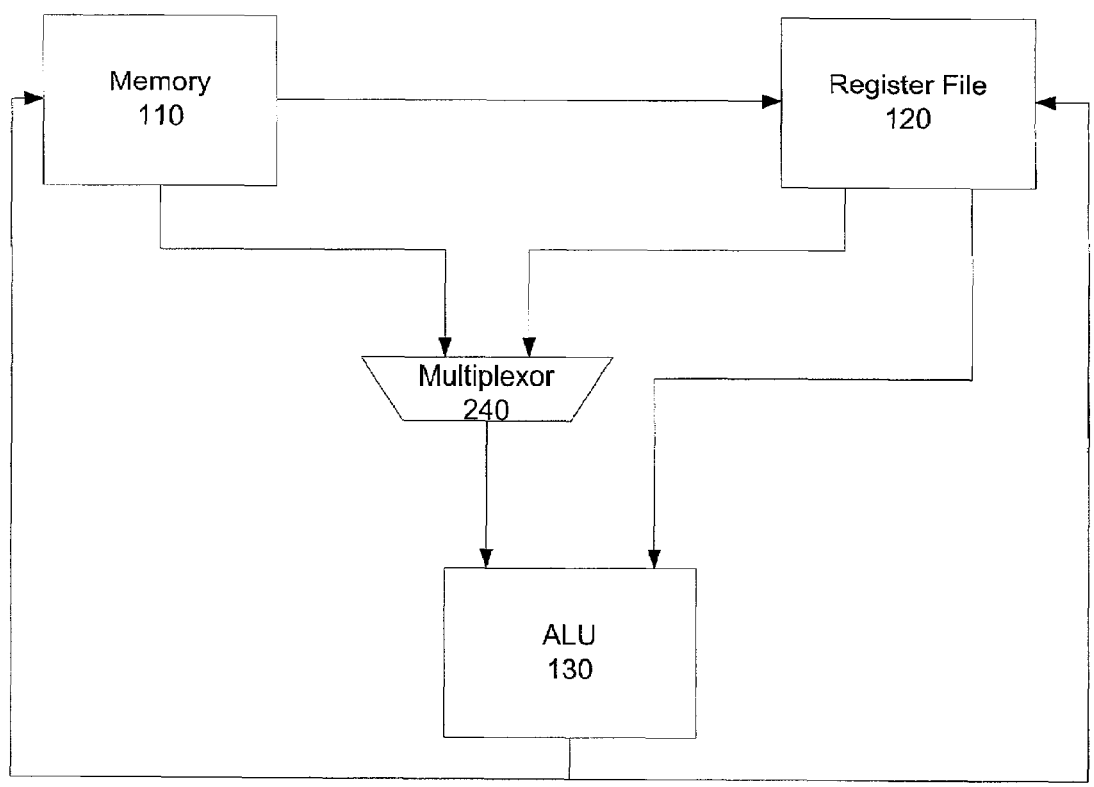
FIG. 2 is a block diagram representing a CISC processor.

Another type of conventional processor is one with a CISC architecture. FIG. 2 is a block diagram illustrating one possible implementation of a CISC processor 200. The CISC processor 200 comprises a memory 110, a register file 120, an ALU 130, and a multiplexor 240.

The CISC processor 200 does not have a load-store architecture. Operands in memory 110 can be accessed directly by the ALU 130. The CISC processor 200 can perform arithmetic on two operands. One of these operands can be either from memory 110 or from register file 120. The second operand is from register file 120. The multiplexor 240 selects whether the first operand will be from memory 110 or from register file 120 for a given operation. Once the requisite arithmetic is performed by the ALU 130, the result can be stored either in the memory 110 or in the register file 120.

In the case of a CISC processor 200, the width of the operands remains the same all the way from the memory 110 to the ALU 130 and back to memory 110. The instructions in a CISC processor themselves specify the width of the add. A CISC processor 200 however, has variable length instructions. Variable length instructions add complexity to the system. One of the reasons for this is that it is more computation-intensive for processors to fetch and decode variable length instructions.

Figure 3A:
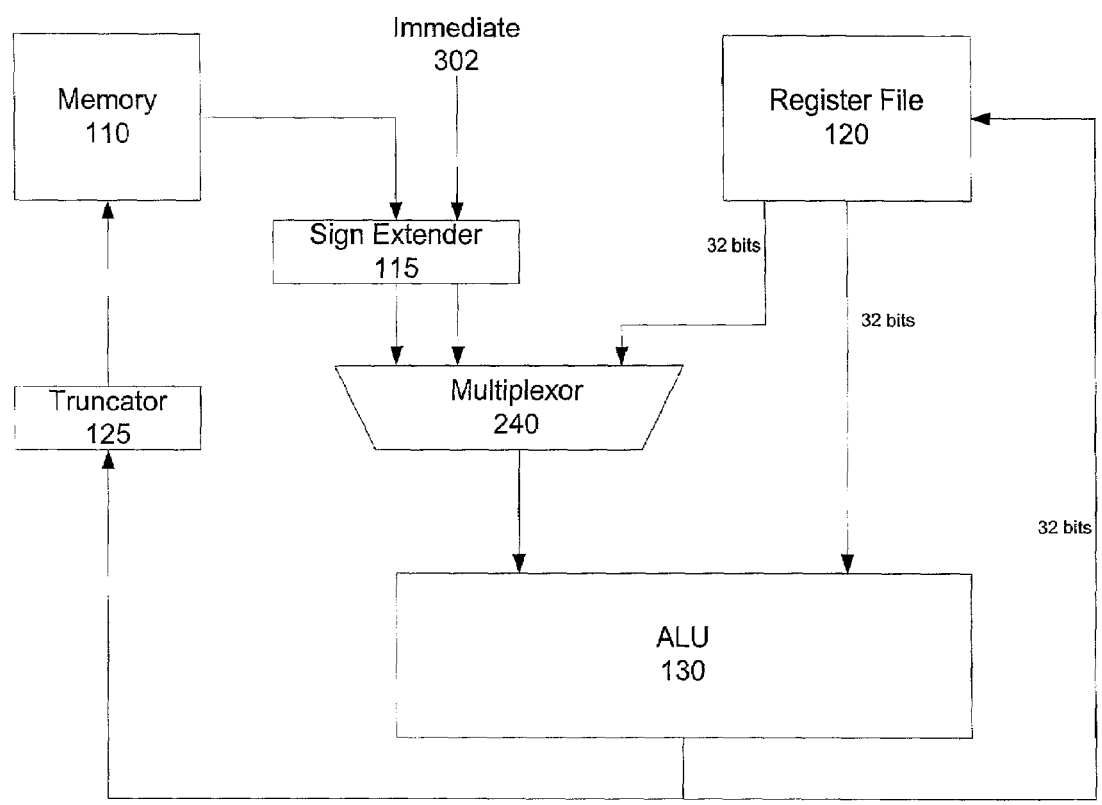
FIG. 3A is a block diagram of a processor in accordance with an embodiment of the present invention.

FIG. 3A is a block diagram of one embodiment of the present invention. The processor 300 comprises a memory 110, a register file 120, an ALU 130, a multiplexor 240, an immediate 302, a sign extender 115, and a truncator 125.

In one embodiment of the present invention, the ALU 130 performs arithmetic on two operands. The first source operand is a general operand. It can be from the register file 120. Alternatively, it can be an immediate 302. If the immediate is not 32 bits wide, it is passed through the sign extender 115 to make it 32 bits wide. Further, the first operand can also be from memory 110. If the data stored in memory 110 is 8-bit or 16-bit data, it is extended by the sign extender 115 up to 32 bits in one embodiment of the present invention. The second source operand is from the register file 120. The ALU 130 then performs the requisite arithmetic on the 32-bit wide data. The result can then be stored either in register file 120, or directly in memory 110. If the result is stored directly in memory 110, a truncator 125 may be used to store the result as 8-bit or 16-bit data.

Like a RISC processor 100, the processor 300 has a 32-bit ALU, and 32-bit data coming from the register file 120. Unlike the RISC processor 100, however, the processor 300 can access data from, and store data in, memory 110 directly, and does not have a "load and store" type of architecture. The data from memory 110 can be of any size, and this size is specified by the instruction. Instructions used by processor 300 are further described with reference to FIG. 4 and FIG. 6.

Like the CISC processor 200, the processor 300 has one operand coming from the register file 120, while the other operand can come from either the memory 110 or the register file 120. However, unlike the CISC processor 200, the processor 300 does not have variable length instructions.

Figure 3B:
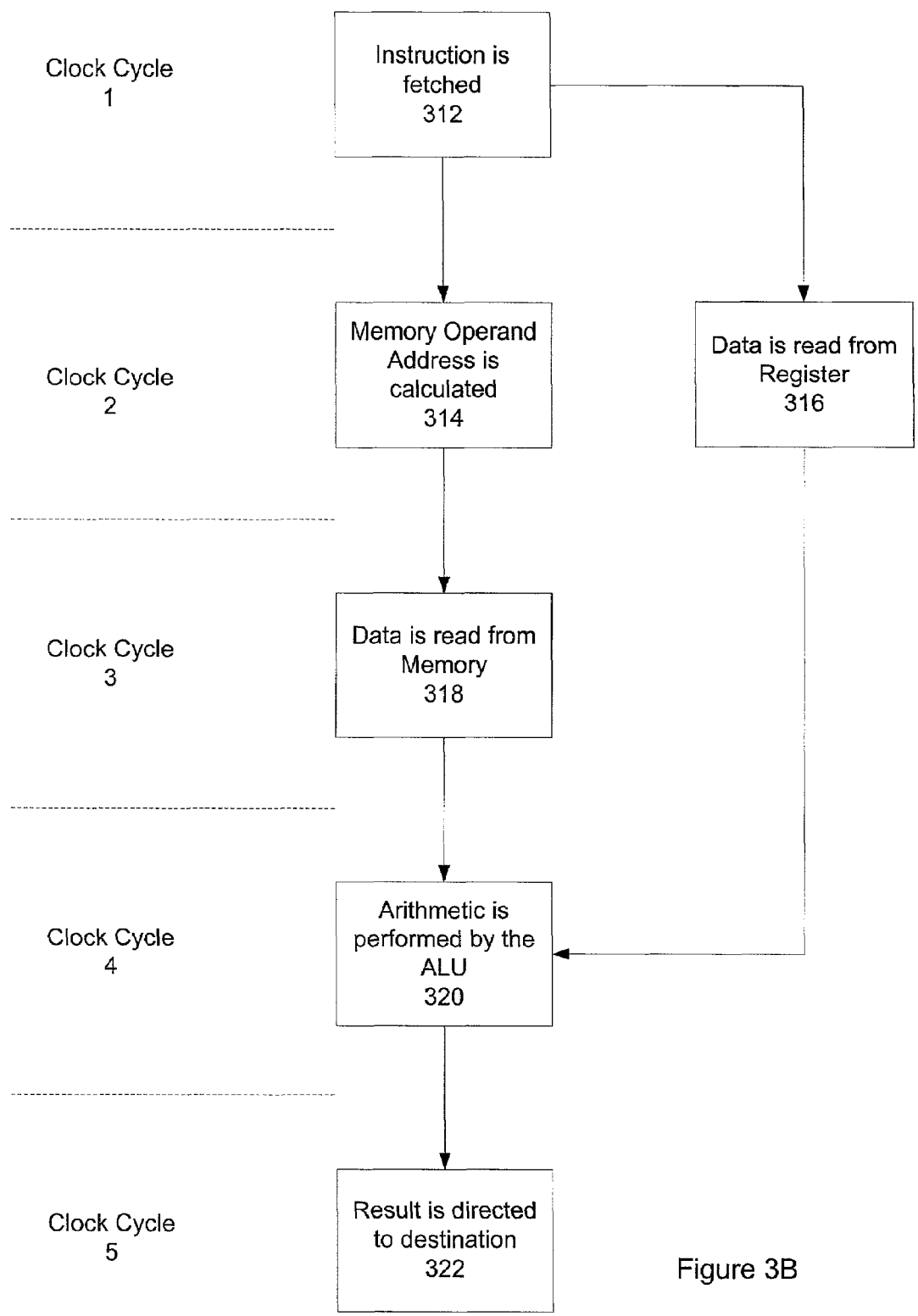
FIG. 3B is a flowchart illustrating the steps performed by a processor in accordance with one embodiment of the present invention.

FIG. 3B is a block diagram which illustrates the various stages in the pipeline which processor 300 employs in one embodiment of the present invention. In the embodiment illustrated in FIG. 3B, the first operand is from memory 110. Each of the steps depicted in FIG. 3B occurs in one clock cycle, with the next step occurring in the next cycle. In the first clock cycle, the processor 300 fetches 312 an instruction. In one embodiment of the present invention, this instruction specifies the size of the memory operand. In one embodiment, the size of the memory operand is specified in the Operation Code (OpCode). For a further discussion of a format of the instruction, refer to the discussion regarding FIG. 4 below. Having the instruction specify the operand width for memory access saves encoding space in the instruction set. The smaller encoding enables a 32-bit instruction with two memory operand specifiers.

In the second clock cycle, the memory operand address is then calculated 314. The details regarding the calculation of the memory operand address are discussed with reference to FIG. 5. Also in the second clock cycle, data is read 316 from the register file 120.

In the third clock cycle, data is read 318 from the memory location specified by the memory operand address calculated 314. In the next clock cycle, arithmetic is performed 320 by the ALU 130. In the fifth clock cycle, the result of the operation is then directed 322 to the destination. The destination for the result can be memory 110, a register file 120, or, in some cases, an immediate.

When an immediate is specified as a destination for an operation, functionally, this indicates that the result of that operation is stored nowhere. Nonetheless, the operation is actually performed, and this can result in valuable "side-effects." For instance, an address register can be auto-incremented in this manner. With reference to FIG. 3B, it can be seen that by using the immediate as a destination, an address register can be incremented in clock cycle 2 itself, rather than waiting until clock cycle 5. Thus the auto-incrementing can occur much faster in this manner. Another instance where the immediate can be used as a destination is for setting a condition code. A condition code can be used, for example, to compare A and B, and determine which branch of a tree to follow based on which of A and B is greater. This comparison can be performed by performing the operation of subtracting B from A, and using the result to set the condition code. However, there is no value in actually storing this result. In such a situation, the result, once known, can be "thrown away" by specifying an immediate as the destination for the operation.

In a conventional system a typical set of condition codes includes four condition codes (negative, zero, overflow, and carry). In contrast, a processor in accordance with one embodiment of the present invention has a set of eight condition codes: the above-mentioned four codes for 16 bits, and the above-mentioned four codes for 32 bits. The conditional brand instructions can select either the 16-bit codes or the 32-bit codes.

In a system in accordance with one embodiment of the present invention, a Load Effective Address (LEA) operation is performed. As can be seen from FIG. 3B, in general, the memory address is calculated 314, the data from the memory is then read 318, and the result is stored 320 (This can also be seen with reference to FIG. 3B). However, it is sometimes useful to simply calculate 314 an address, and to store 320 the result, without reading 318 the data from memory. As discussed above, each step illustrated in FIG. 3B occurs in one clock cycle. Thus if the steps in FIG. 3B are performed, it takes several clock cycles for the result to be stored 320. Specifically, the result is stored 320 in clock cycle 5. Instead, LEA occurs within clock cycle 2.

FIG. 4 illustrates one instruction format 400 used by processor 300 in one embodiment of the present invention. In one embodiment, processor 300 uses fixed-length instructions that are 32 bits wide. In alternate embodiments, the fixed-length instructions may have a different size. The instruction format 400 in FIG. 4 has three operands—two sources, and one destination. In an embodiment, the processor may use different instruction formats, such as those operating with one or two operands, and those using immediates.

In instruction format 400, out of the 32 available bits, 5 bits are used to represent the Operation Code (OPCode). 11 bits are used to encode the destination, as well as one source. 5 bits are used to represent the second source. The 5-bit source has to be a register 110. Specifically, since 5 bits are used to encode this source, this operand data has to be from one of 32 registers. The other source and the destination are each encoded using 11 bits. This source and destination can each be from either memory 110 or register file 120. In other words, by using this instruction format 400, processor 300 can have two operands (one source and the destination) from memory 110, while still having fixed-length instructions. In one embodiment of the present invention, it is possible to have two memory operands in a single instruction because a memory operand can be encoded using only 11 bits. The manner in which a memory operand can be encoded using 11 bits is discussed in detail below with reference to FIG. 6.

A processor's ability to process two memory operands in one instruction reduces the number of instructions required to perform some functions. For instance, by using a "move" operation, data can be moved from one memory location to another in a single instruction. In a conventional RISC processor 100, this would involve loading data from the first memory location to a register, and then storing the data from the register to the second memory location. Thus, multiple instructions would be required by a conventional RISC processor 100 to perform move data from one memory location to another memory location. Table 1 compares moving data from location A in memory to location B in memory with a conventional RISC processor and with a system in accordance with an embodiment of the present invention.

TABLE 1

| Steps | Instructions with a conventional RISC processor | Instructions with an embodiment of the present invention |
|---|---|---|
| 1 | Load A | Move B, A |
| 2 | Store B | |

Another example of the use of two memory operands is that data from memory can be added with data from a register and stored in memory. The first source operand could identify the memory location for the data to be added, the second source operand could identify the register, and the destination could identify the memory location where the result is to be stored. Thus, by using a system in accordance with the present invention, this operation can also be performed with a single instruction. Unlike in a conventional RISC processor 100, this operation can be performed without the steps of loading the data to a register, performing the add, and then storing the result. Table 2 compares the computation of C=A+B (where A and C are memory locations) with a conventional RISC processor and with a system in accordance with an embodiment of the present invention.

TABLE 2

| Steps | Instructions with a conventional RISC processor | Instructions with an embodiment of the present invention |
|---|---|---|
| 1 | Load A | Add C, B, A |
| 2 | Add C, B, A | |
| 3 | Store C | |

From the above examples, it can be seen that the present invention serves to eliminate several of the load and store instructions inherent in RISC architecture.

Referring again to FIG. 4, the instruction format 400 specifies the size of the memory operand as mentioned above. In one embodiment, the size of the memory operand is specified in the OPCode. In one embodiment of the present invention, one, two, and four are use for 8-bit, 16-bit, and 32-bit operands respectively. For example:

Move.1 implies Move one byte;
Move.2 implies Move two bytes;
Move.4 implies Move four bytes.

However, not all instructions support all three operand sizes. For example, the multiply instruction will not use any suffixes, as only multiplication with 2 bytes is permissible in one embodiment. Use of Mul.2 in such a case may lead one to think that Mul.1 and Mul.4 are also allowed. Therefore, only instructions that allow multiple operand sized have suffixes, and some instruction may only support 16-bit and 32-bit sizes.

Figure 5:
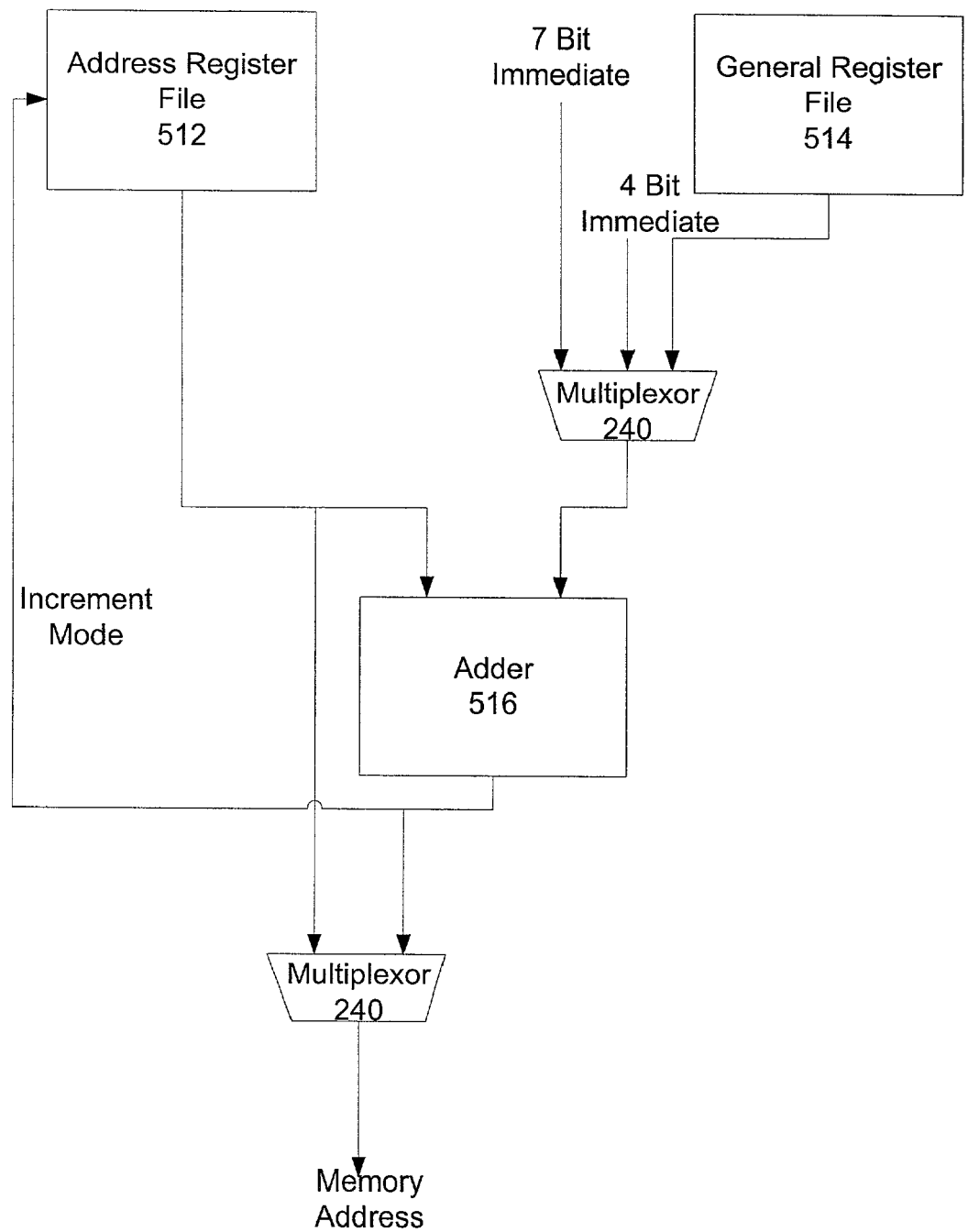
FIG. 5 illustrates how a memory operand address is calculated in one embodiment of the present invention.

FIG. 5 is a block diagram illustrating how, in one embodiment of the present invention, the memory operand address is calculated 314. FIG. 5 illustrates several components of processor 300 including an address register file 512, a general register file 514, an adder 516, and a multiplexor 240. In one embodiment of the present invention, processor 300 has 8 address registers in the address register file 512 and 32 general registers in the general register file 514. A distinction is made between address registers and general registers, so as to achieve some of the addressing modes discussed below.

The location of the first operand (discussed earlier with reference to FIG. 3A) can be calculated using various address modes. In one embodiment, the present invention has the addressing modes discussed below. These powerful addressing modes for the first operand permit a higher code density, and thus a relatively smaller code size.

The first three addressing modes are illustrated in FIG. 5, and the other two are illustrated in FIG. 3A:

1. Register+Immediate Addressing Mode:

In this addressing mode, the value in the register added to the immediate gives the memory address in which the memory operand is located. In one embodiment of the present invention, the register+immediate addressing mode is implemented as Address Register+7-bit immediate. The term "address register" is further discussed below with reference to FIG. 6.

2. Register+Register Indirect Addressing Mode:

In one embodiment of the present invention, this addressing mode is implemented as Address Register+General Register. These terms are discussed further with reference to FIG. 6. The value in the Address Register added to the value in the General Register gives the memory address in which the memory operand is located.

3. Register+Immediate Auto-Increment Addressing Mode:

In one embodiment, this is implemented as auto-increment in conjunction with the Address Register+4-bit immediate addressing mode. In one embodiment of the present invention, there are two different implementations of this addressing mode:

(i) Pre-increment: In this mode, the Address Register itself is used for the memory address in which the operand data is located, and the Address Register+4-bit Immediate is the new value stored in the Address Register.

(ii). Post-increment: In this mode, Address Register+4-bit Immediate is used for both the memory address in which the operand data is located, and for storing a new value in the Address Register.

4. Register Direct Addressing Mode:

In this addressing mode, the data in the register itself is used as the first operand.

5. Immediate Addressing Mode:

In this addressing mode, the value of the immediate itself is used as the first operand.

It can be seen that in one embodiment, the present invention does not inherently have a direct memory addressing mode (In such an address mode, the address of the memory in which the first operand is located is directly specified.) However, in one embodiment of the present invention, such a direct memory addressing mode can be used by inserting an immediate into an address register. This is done using the Move Address register Immediate (MoveAI) instruction. In particular, by using the MoveAI instruction in conjunction with the Address Register+7-bit Immediate instruction, a large number of bits can be used to specify the memory address. In one embodiment, a 24-bit Immediate can be moved into the Address Register. This address register can then be used in conjunction with the Address Register+7-bit Immediate instruction, to obtain a 31-bit memory address.

FIG. 6 illustrates how, in one embodiment of the present invention, the first operand is encoded using 11 bits, and how the various addressing modes discussed above are encoded. Each of the rows in FIG. 6 corresponds to one of the addressing modes discussed above.

Row 1 corresponds to the Address Register+7-bit immediate mode. The 7-bit immediate is represented by $I_0$–$I_6$. In one embodiment of the present invention, 3 bits ($A_0$–$A_3$) are used to specify the address register 512. Since only 3 bits are used to specify the address register, one of only 8 address registers can be specified. In Row 1, the leftmost "1" in the row indicates that the Address Register+7-bit immediate mode is being used.

Row 2 in FIG. 6 corresponds to the Register+Register addressing mode discussed above. One of these registers is selected from the 8 address registers in the address register file 512, while the other is selected from the 32 data registers in the general register file 514.

Row 3 corresponds to the Address Register+4-bit addressing mode with auto-increment. The 4-bit immediate is represented by $I_0$–$I_3$. The Address Registers are encoded by bits $A_0$–$A_3$ as above. In one embodiment, the "M" indicates the post (if M=0) or pre (if M=1) addition of the increment mode.

Row 4 corresponds to the Register Direct addressing mode discussed above. Conventional systems typically have 5 bits to specify registers as discussed above with reference to FIGS. 1C & 1D. Therefore only 32 registers can be directly addressed. Thus, most conventional processors have separate addressing modes for general registers and control registers. In contrast, as indicated in Row 4, the present invention has 8 bits for specifying registers. Thus 256 registers can be directly addressed in a system in accordance with an embodiment of the present invention. Hence any instruction in an embodiment of the present invention can operate on any register, regardless of whether the register is a general register, address register, or control register.

Row 5 corresponds to the Immediate addressing mode discussed above. In this case, the 8-bit immediate is used as the first operand.

In Rows 2 through 5, the three leftmost bits are used to indicate which addressing mode is being used.

The various addressing modes for the present invention discussed above effectively allow, in one embodiment, all of the on-chip Static Random Access Memory (SRAM) to be treated as a very large register file. That is, the data memory locations can be accessed in one cycle, the same as registers, and they can be used as source or destination operands in most instructions.

Figure 7:
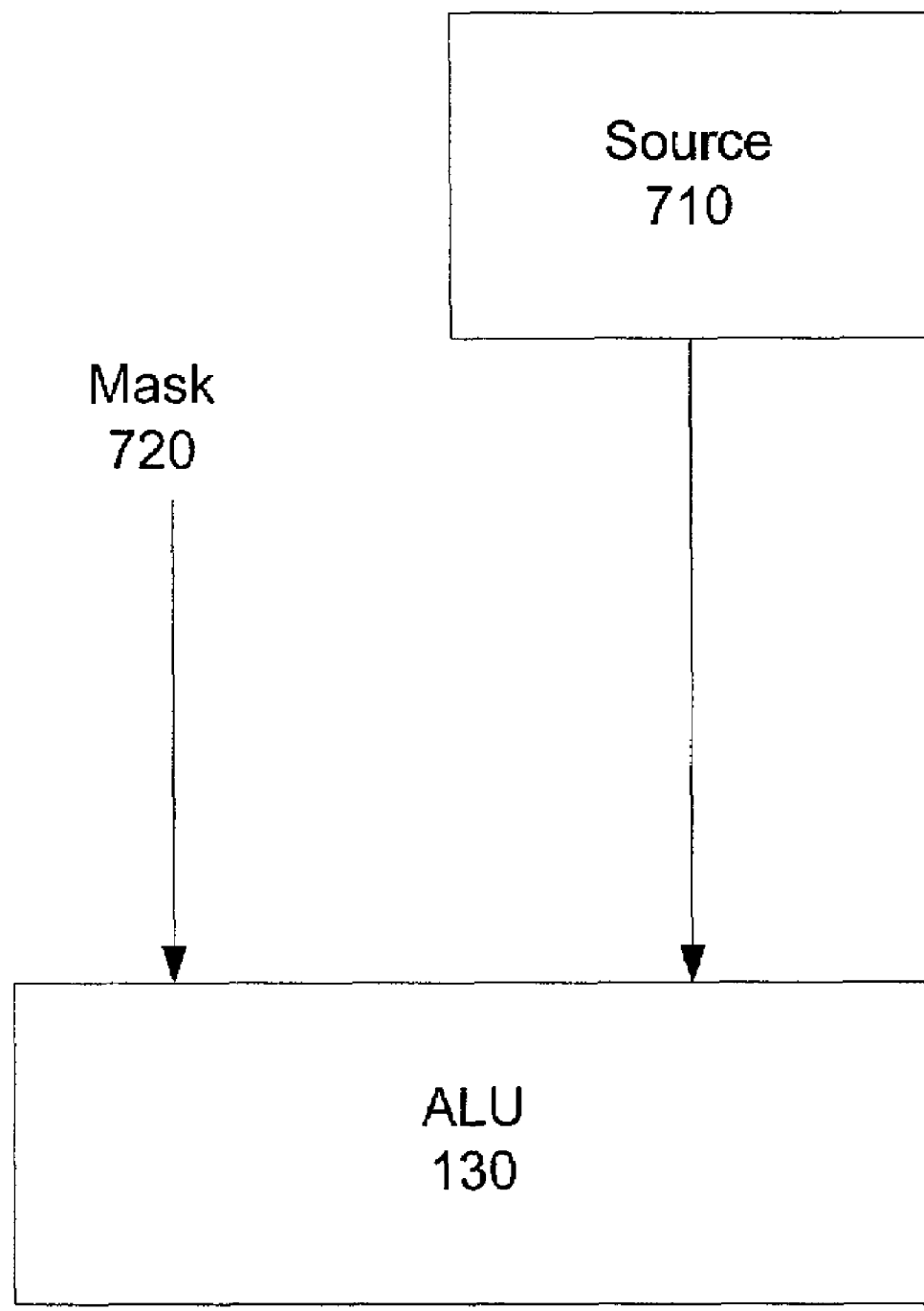
FIG. 7 illustrates the implementation of a single bit semaphore.

FIG. 7 comprises an ALU 130, a source 710, and a mask 720. The source 710 is a general source. In one embodiment, it can be from memory. In another embodiment, it can be from a register file. In yet another embodiment, it can be an immediate.

FIG. 7 illustrates how, in accordance with one aspect of the present invention, a single bit semaphore is implemented. This is in contrast to some conventional systems which use more bits (e.g., an entire 32-bit word) to implement a semaphore. Semaphores are needed when an instruction set can support multiple processors, or a single processor with multiple threads. A semaphore is a hardware or software flag. In multitasking systems, a semaphore is a variable with a value that indicates the status of a common resource. A semaphore can be used to lock the resource that is being used. A process needing the common resource checks the semaphore to determine the resource's status and then decides how to proceed.

In one embodiment, the bit number to be set or cleared is specified in the instruction. Based on this bit number, a mask 720 is created. If the bit is to be set, the mask 720 has all zeros, except for a 1 in the position of the bit to be set. This mask is then ORed with the source 710 data to set the bit. If the bit is to be cleared, the mask 720 has all 1s, except for a zero in the position of the bit to be set. This mask is then ANDed with the source 710 data to clear the bit. The prior value of the bit (before it is set or cleared) is used to set a condition code. Thus the present invention implements a single bit semaphore.

Figure 8:
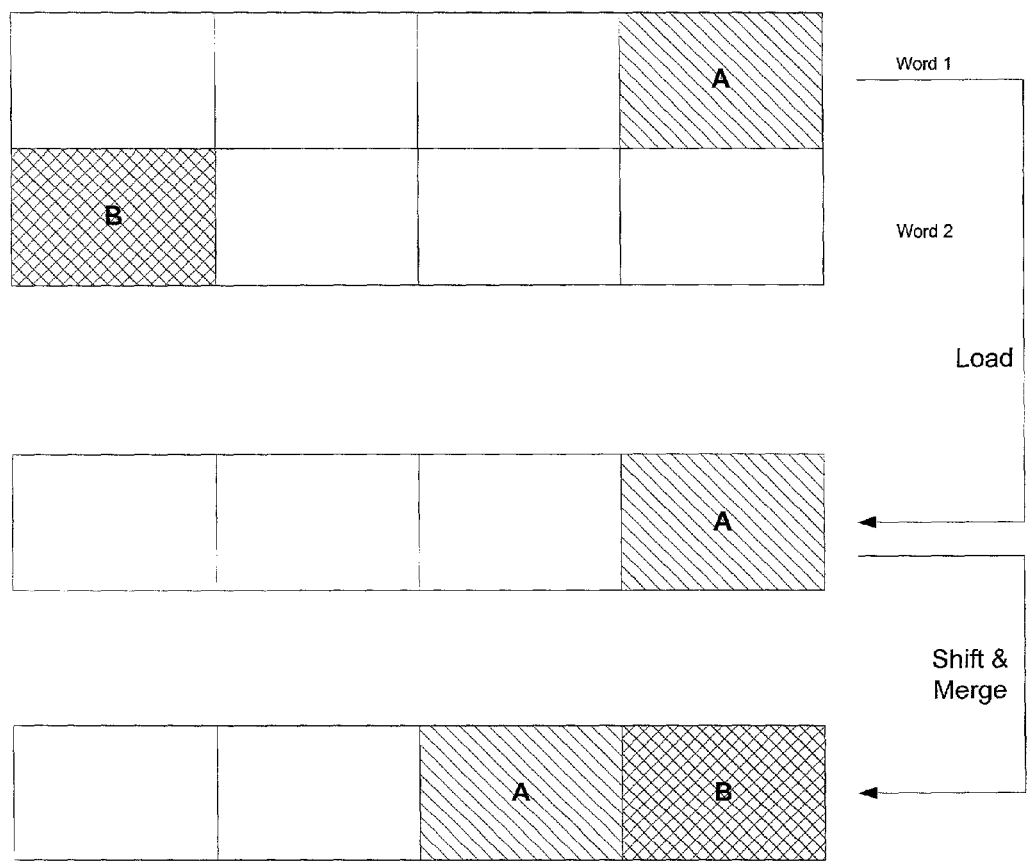
FIG. 8 illustrates a shift-and-merge instruction.

In another aspect of the present invention, shift-and-merge instructions are used to access data across word boundaries. Network data enters the processor as a stream of bytes. Sometimes, the data of interest falls across two consecutive "words." A word is typically comprised of 32 bits. An example of this is shown in FIG. 8. The data of interest is AB, which falls across Word 1 and Word 2.

Memory accesses typically access one byte at a time. Therefore the situation described above will require two memory accesses—one to access byte A, and another to access byte B. Moreover, these two bytes (A & B) then have to be put together in order to procure the data of interest.

Various architectures solve this problem in different ways. For instance, a RISC instruction set may use "Load Left" and "Load Right" instructions. A RISC processor is generally used to manipulate 32-bit data. "Load Left" and "Load Right" instructions imply that data from Word 1 is written to the left half of a register, and data from Word 2 is written to the right half of the register in order to obtain the data desired. However, this results in partial register writes, which slow down pipeline processing.

In one embodiment of the present invention, a "shift-and-merge" instruction is used to circumvent this problem. The present invention is often used to manipulate 16-bit data. Instead of pulling out the whole of both Word 1 and Word 2, only the byte of interest is pulled from each word. In this case, byte A is loaded into a register. Then a "shift-and-merge" instruction is executed, which shifts data (in this example, byte A) to the left by one byte, and merges new data (in this example, byte B) into the same register. This is illustrated in FIG. 8. In alternate embodiments of the present invention, more than 1 byte may be shifted-and-merged.

In yet another aspect of the present invention, Instruction Read/Instruction Write/Instruction Erase (IWRITE/IREAD/IERASE) instructions are used in multi-thread environments. Most modern processors have a single memory, which is used for storing both instructions and data. However, in one embodiment of the present invention, the processor has separate memory spaces for data and instructions. There are several reasons for this separation of the data and instruction memories. First, since instructions in accordance with the present invention allow for two memory operands in a single instruction, data memory needs to have two ports. Instruction memory, on the other hand, need have only one port. If a single memory space were used for instructions and data, two ports would have to be implemented for all of it. Since two port memories require more silicon real-estate than one port memories, bifurcating the memory space into data memory and instruction memory makes for a smaller chip. Second, execution of instructions should be deterministic. That is, even though multi-threading may be permitted, the performance of one thread should not affect the performance of another thread. If a single memory space existed for data and instructions, modifying instructions while data is being fetched may cause problems.

For at least these reasons, in one embodiment of the present invention, memory is separated out into data memory and instruction memory. It is thus needed to read, write and erase not only the data memory, but also the instruction memory. The IREAD, IWRITE, and IERASE instructions are designed for this. In a multi-thread environment, it is important for these instructions to be non-interfering with other threads.

Figure 9:
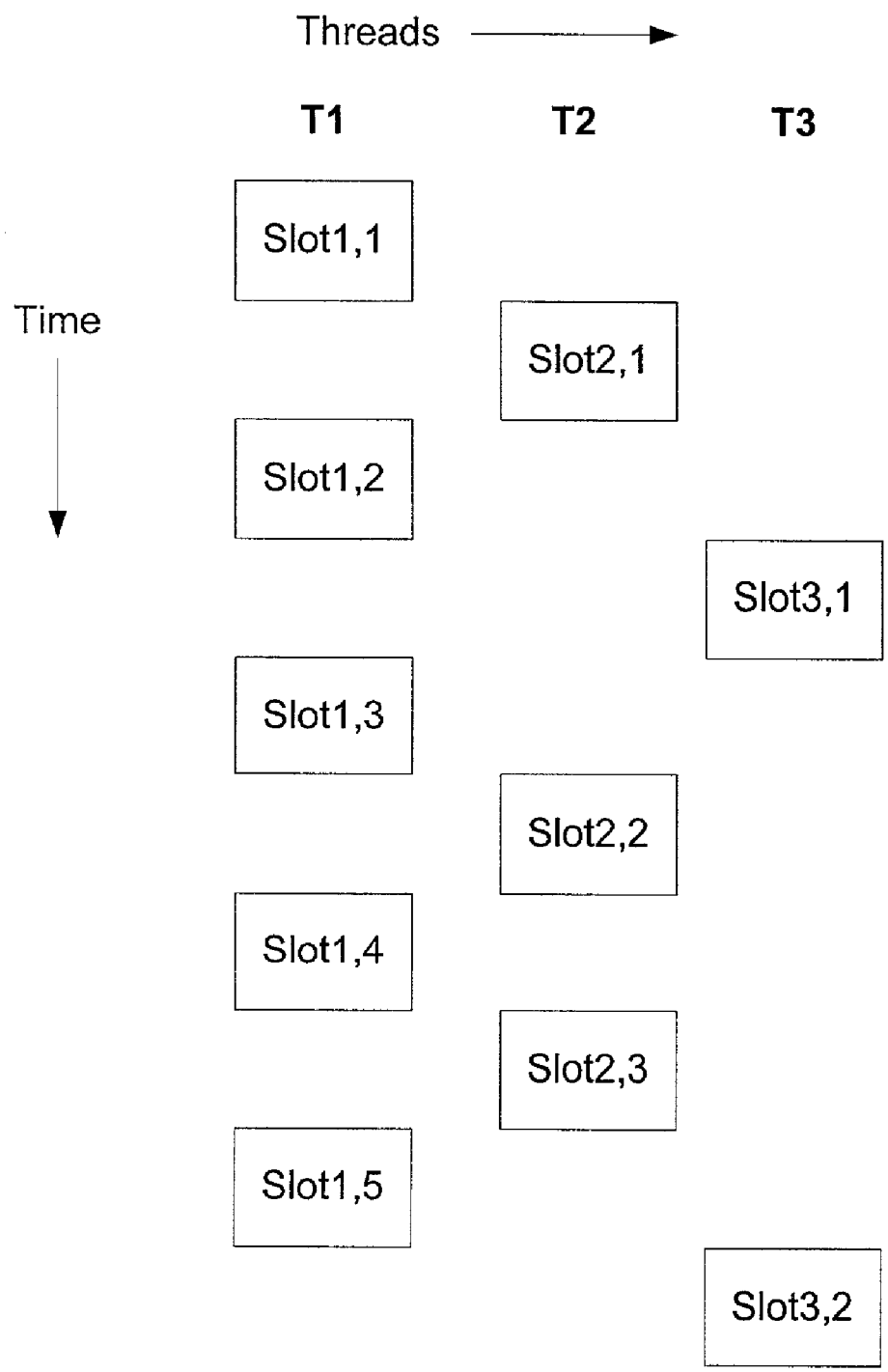
FIG. 9 illustrates time slots assigned to multiple threads.

FIG. 9 illustrates a multi-thread environment. The X-axis represents multiple thread, T1, T2, and T3. The Y-axis represents time. Each thread T1, T2, and T3, has its own slots in time, which do not interfere with the time slots assigned to any of the other two threads. Thread T1 has Slot1,1–Slot1,5. Thread T2 has Slot2,1– Slot2,3. Thread T3 has Slot3,1–Slot3,2. In general, one instruction is performed per slot. However, when an IREAD, IWRITE, or IERASE instruction is encountered, the thread actually accesses the instruction to be read, written, or erased in the next slot assigned to it. For instance, if the instruction in Slot2,1 were an IREAD, Slot2,2 would actually access the instruction to be read. The next instruction in T2 would be implemented only in Slot2,3. Using two slots (instead of one) for each of these instructions ensures that IREAD, IWRITE, and IERASE are non-interfering with other threads.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the following claims.

What is claimed is:

1. An embedded processor for providing connectivity in a communications system, comprising:
   a 32-bit arithmetic-logic unit (ALU) comprising a first input, a second input, and an output, the ALU for performing an operation on a first 32-bit operand and a second 32-bit operand and for producing a 32-bit result, the operation specified in a 32-bit instruction fetched by the ALU;
   a 32-bit register file for temporaily holding data, the 32-bit register file coupled to the first input of the ALU and communicatively coupled to the second input of the ALU for providing the first and the second 32-bit operand and coupled to the output of the ALU to receive the 32-bit result as an output from the ALU;
   a memory device communicatively coupled with the second input of the ALU for providing the ALU input-data and communicatively coupled to the output of the ALU for receiving result data, the memory device comprising a storage location of a size of less than 32 bits;
   a sign extender coupled to the memory device for expanding the input-data from the memory to 32-bit data; and
   a multiplexer comprising a first and a second input and an output, the first input coupled to the sign extender for receiving the expanded 32-bit data the second input coupled to the 32-bit register, and the output coupled to the ALU, the multiplexer for selecting between the inputs the source for providing the first 32-bit operand to the ALU.

2. The embedded processor of claim 1, further comprising:
   a truncator communicatively coupled to the ALU and the memory device, the truncator for converting the 32-bit result received from the ALU to a data unit of the size of the storage location in the memory device.

3. The embedded processor of claim 1, wherein the multiplexer further comprises a third input communicatively coupled to an immediate.

4. The embedded processor of claim 3, wherein the immediate is less than 32 bits and wherein the immediate is coupled to the sign expander for converting the immediate to an expanded 32-bit immediate, the sign expander further coupled to the third input of the multiplexer for communicating the expanded 32-bit immediate.

5. The embedded processor of claim 3, wherein the 32-bit instruction comprises a 5-bit OpCode for specifying the operation, an 11-bit source address for specifying a first source location for the first 32-bit operand, a 5-bit source address for specifying a second source location for the second 32-bit operand, and an 11-bit destination address for specifying a destination location to store the 32-bit result.

6. The embedded processor of claim 5, wherein the immediate comprises a 4-bit immediate and a 7-bit immediate, the embedded processor further comprising:
   a general register file having no more than 32 data registers, the general register file comprising memory addressing information;
   a second multiplexer comprising a first, a second, and a third input and an output, the first input coupled to the 7-bit immediate, the second input coupled to the 4-bit immediate, and the third input coupled to the general register file, the multiplexer for selecting between the inputs to provide an output;
   an address register file having no more than 8 registers, the address register file comprising addressing information and an output;
   an adder coupled to the output of the second multiplexer for receiving one of the 7-bit immediate, the 4-bit immediate, and the general register file, and the adder coupled to the address register for adding the output of the second multiplexer with the output of the address register and for providing a sum; and
   a third multiplexer comprising a first input, a second input, and an output, the first input coupled to the address register file, the second input coupled to the adder for receiving the sum, the third multiplexer for choosing between the address register file output and the sum thereby providing the 11-bit source address of the 32-bit instruction according to an address mode.

7. The embedded processor of claim 6, wherein the address mode is one of the group consisting of a Register+Immediate, a Register+Register Indirect, a Register+Immediate Auto-Increment, a Register Direct, and an Immediate addressing mode.

8. The embedded processor of claim 1, wherein the 32-bit instruction comprises a 5-bit OpCode for specifying the operation, an 11-bit source address for specifying a first source location for the first 32-bit operand, a 5-bit source address for specifying a second source location for the second 32-bit operand, and an 11-bit destination address for specifying a destination location to store the 32-bit result.

* * * * *